(12) United States Patent
Hwang et al.

(10) Patent No.: US 8,842,908 B2
(45) Date of Patent: Sep. 23, 2014

(54) METHOD OF SEPARATING FRONT VIEW AND BACKGROUND AND APPARATUS

(75) Inventors: Hyo Seok Hwang, Seoul (KR); Kyung Shik Roh, Seongnam-si (KR); Suk June Yoon, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 96 days.

(21) Appl. No.: 13/331,529

(22) Filed: Dec. 20, 2011

(65) Prior Publication Data

US 2012/0155756 A1  Jun. 21, 2012

(30) Foreign Application Priority Data

Dec. 20, 2010  (KR) ........................ 10-2010-0130839

(51) Int. Cl.
*G06K 9/34* (2006.01)
*G06T 7/00* (2006.01)

(52) U.S. Cl.
CPC ..... *G06T 7/0081* (2013.01); *G06T 2207/20144* (2013.01); *G06T 2207/10024* (2013.01)
USPC ............................ 382/164; 382/170; 382/199

(58) Field of Classification Search
USPC ......... 382/162, 164, 168, 170, 171, 173, 199, 382/291
See application file for complete search history.

(56) References Cited

U.S. PATENT DOCUMENTS

| 6,281,903 B1 * | 8/2001 | Martin et al. ................ 345/421 |
| 2007/0269108 A1 | 11/2007 | Steinberg et al. |

FOREIGN PATENT DOCUMENTS

| JP | 10320562 | 4/1998 |
| KR | 10-2009-0111939 | 10/2009 |
| KR | 10-2010-0092413 | 8/2010 |

* cited by examiner

*Primary Examiner* — Phuoc Tran
(74) *Attorney, Agent, or Firm* — Staas & Halsey LLP

(57) ABSTRACT

A method of initially estimating a front view portion of a photographed image and separating the photographed image into a front view and a background without user interaction and apparatus performing the method are provided. The method of separating a front view and a background of an image includes dividing one or more pixels included in a photographed image into pixel groups according to color similarity between the pixels, estimating the position of the front view in the image divided into the pixel groups, and separating the front view and the background based on the estimated position of the front view. The method automatically separates the front view and the background of the image without a user input.

10 Claims, 13 Drawing Sheets
(3 of 13 Drawing Sheet(s) Filed in Color)

METHOD OF SEPARATING FRONT VIEW AND BACKGROUND AND APPARATUS

CROSS-REFERENCE TO RELATED APPLICATIONS

This application is related to and claims priority to Korean Patent Application No. 10-2010-130839, filed on Dec. 20, 2010 in the Korean Intellectual Property Office, the disclosure of which is incorporated herein by reference.

BACKGROUND

1. Field

The embodiments discussed herein are related to a method of separating a front view and a background of a photographed image.

2. Description of the Related Art

When a robot recognizes an object or a person in an indoor or outdoor environment, a technique for separating an input image into a front view and a background is important. In a recognition technique, an object may be erroneously recognized due to a feature point extracted from a place other than an object. Even when using a boundary-based recognition algorithm, a recognition rate is lowered due to misjudgment of an object boundary. Accordingly, accurate separation of an image into a front view and a background is important in a robot recognition technique.

There are various methods of separating a front view and a background of an image. A method of expressing an image using a Markov Random Field (MRF) model and minimizing energy using graph cut or Belief Propagation (BP) is generally used. To accurately separate a front view and a background, a predefined front view region and a predefined background region are necessary.

Algorithmic results for separating a front view and a background of the related art is not completely automated. A front view region and a background region are set by a user and the front view and the background of the image are separated based on the set regions.

In addition, in the algorithm for separating the front view and the background in the related art, recognition rate may be lowered due to background noise, edges, or patterns within the image.

SUMMARY

An aspect of an exemplary embodiment discussed herein relate to providing a method of initially estimating a front view portion from a photographed image and separating the photographed image into a front view and a background based on the front view portion without user interaction.

Additional aspects of the invention will be set forth in part in the description which follows and, in part, will be obvious from the description, or may be learned by practice of the invention.

In accordance with an aspect of an exemplary embodiment, a method is provided of separating a front view and a background of an image including dividing one or more pixels included in a photographed image into pixel groups according to color similarity between the pixels, estimating the position of the front view in the image divided into the pixel groups, and separating the front view and the background based on the estimated position of the front view.

The dividing of one or more pixels included in a photographed image into the pixel groups according to the color similarity between the pixels may include converting an RGB color space of the photographed image into a Commission internationale de l'eclairage (CIE) Lab color space.

The dividing of one or more pixels included in a photographed image into the pixel groups according to the color similarity between the pixels may include calculating a color distance between any one pixel (first pixel) of the image converted into the CIE Lab color space and an adjacent pixel (second pixel) of the first pixel, changing the color of the second pixel to the color of the first pixel if the color distance is less than a threshold, and forming the pixel groups.

The dividing of one or more pixels included in a photographed image into the pixel groups according to the color similarity between the pixels may include calculating a color distance between the second pixel and an adjacent pixel (third pixel) of the second pixel if the color distance between the first pixel and the second pixel is greater than or equal to the threshold, and changing the color of the third pixel to the color of the second pixel if the calculated color difference is less than the threshold.

The estimating of the position of the front view in the image divided into the pixel groups may include detecting edges between the pixel groups from the image divided into the pixel groups and generating an edge image, detecting nodes where two or more edges meet from the generated edge image, calculating a circular score indicating similarity between a start node and other nodes in a circular path which starts from any one of the nodes, passes through the edges and the other nodes and arrives at the start node, and estimating a circular center having a highest circular score among the calculated circular scores as the center position of the front view.

The generating of the edge image may include generating the edge image using a canny edge detector.

Each node where two or more edges meet may be a center pixel of an n×n window when the number of pixel groups included in the n×n window is three or more while moving the n×n window from a start pixel to a last pixel of the image.

The calculating of the circular score may include generating a two-dimensional color histogram based on an a* axis and a b* axis of the CIE Lab color space of pixels belonging to the pixel groups forming each node, comparing the two-dimensional color histograms of pixel groups of two nodes having three or more pixel groups and calculating a largest two-dimensional color histogram as a histogram similarity, and calculating the circular score of the circular path based on the calculated histogram similarity.

The calculating of the circular score of the circular path may include calculating the circular score such that an edge passing through the circular path is not selected more than once.

The comparing of the histograms may be performed based on a chi square test.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects of the invention will become apparent and more readily appreciated from the following description of the embodiments, taken in conjunction with the accompanying drawings of which.

DETAILED DESCRIPTION

Figure 1:
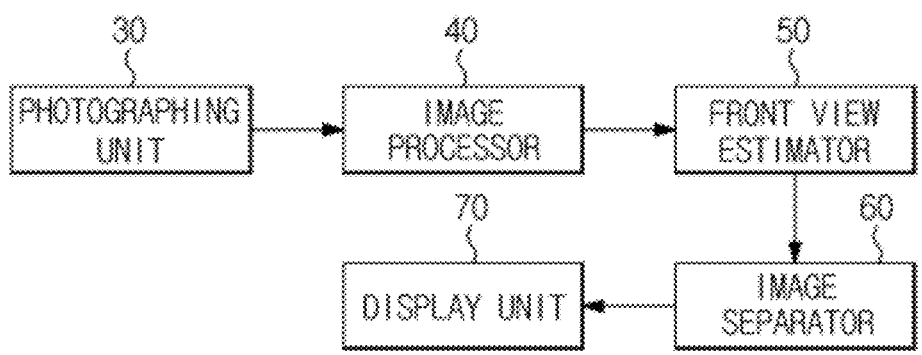
FIG. 1 illustrates a system for separating a front view and a background of a photographed image according to an embodiment of the present invention.

Reference will now be made in detail to the embodiments of the present invention, examples of which are illustrated in the accompanying drawings, wherein like reference numerals refer to like elements throughout.

FIG. 1 illustrates a system for separating a front view and a background of a photographed image according to an embodiment of the present invention.

The system for separating the front view and the background of the image includes a photographing unit 30, an image processor 40, a front view estimator 50, an image separator 60 and a display unit 70.

The photographing unit 30 photographs an object and acquires an image. The photographing unit 30 may include a camera and a video camera.

The image processor 40 processes the image acquired by the photographing unit 30, for ease of front view estimation. The image processor 40 generates pixel groups based on a color difference between one or more pixels forming the image. Pixels having similar colors may be treated as one group.

The front view estimator 50 distinguishes between the front view and the background based on the pixel groups generated by the image processor 40 and estimates the front view.

The image separator 60 separates the front view estimated by the front view estimator 50 from the background of the image.

The display unit 70 displays the front view separated by the image separator 60.

Figure 2:
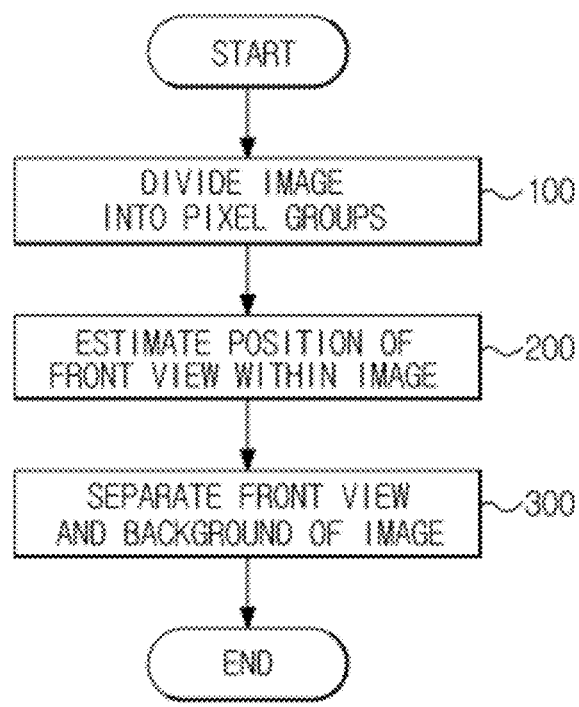
FIG. 2 illustrates a method of separating a front view and a background of an image according to an embodiment of the present invention.

FIG. 2 illustrates a method of separating a front view and a background of an image according to another embodiment of the present invention.

One or more pixels included in a photographed image are divided into pixel groups according to color similarity between pixels (operation 100 The position of a front view of the image divided into the pixel groups may be estimated (operation 200). The front view and the background of the image are separated based on the estimated position of the front view within the image.

Figure 3:
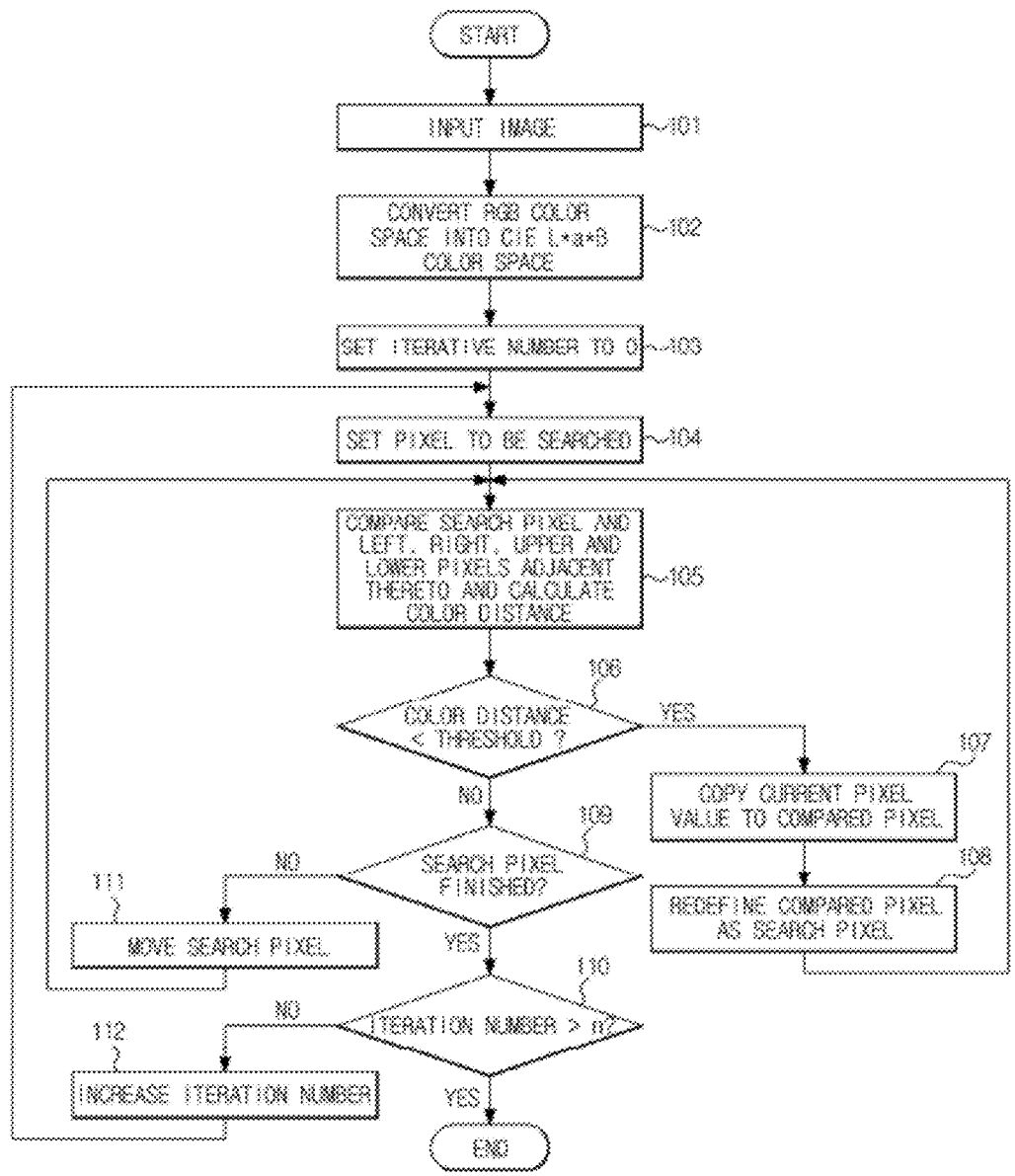
FIG. 3 illustrates a process of dividing an image into pixel groups according to an embodiment of the present invention.

Division of one or more pixels included in the photographed image into pixel groups according to color similarity between the pixels is disclosed with reference to FIG. 3.

FIG. 3 illustrates a process of dividing an image into pixel groups according to an exemplary embodiment of the present invention.

One or more pixels included in a photographed image may have different color values. If a front view and a background of an image are separated using the photographed image, a node and an edge of the image are increased in proportion to the size of the image. That is, if the photographed image is used, error occurs due to image noise or a calculation time required for separating a front view and a background of an image may be increased.

Therefore, the photographed image may be divided into pixel groups as illustrated in FIG. 3.

The photographed image is input (operation 101).

The input image may have a RGB color space. In the RGB color space, only three wavelengths of R (red), G (green) and B (blue) may be quantitatively expressed and brightness, chromaticity and color of the image may not be specifically expressed.

Therefore, the RGB color space may be converted into a CIE Lab (CIE L*a*b) color space (102).

The CIE Lab color space is a color model similar to how humans recognize color and may express the color in a two-dimensional matrix based on an L* channel indicating brightness, an a* channel indicating color, and a b* channel indicating chromaticity. The input RGB image may be converted into the CIE Lab color space using Equation 1 and Equation 2.

$$\begin{bmatrix} X \\ Y \\ Z \end{bmatrix} = \begin{bmatrix} 0.412453 & 0.357580 & 0.180423 \\ 0.212671 & 0.715160 & 0.072169 \\ 0.019334 & 0.119193 & 0.950227 \end{bmatrix} \begin{bmatrix} R \\ G \\ B \end{bmatrix} \quad \text{Equation 1}$$

$$X = X/Xn \quad (Xn = 0.950456) \quad \text{Equation 2}$$
$$Z = Z/Zn \quad (Zn = 1.088754)$$
$$L = 116 Y^{\frac{1}{3}} \quad (Y > 0.008856)$$
$$L = 903.3 Y \quad (Y <= 0.008856)$$
$$a = 500(f(X) - f(Y)) + \text{delta}$$
$$b = 500(f(X) - f(Z)) + \text{delta}$$
$$f(t) = t^{\frac{1}{3}} \quad (t > 0.008856)$$
$$f(t) = \frac{7.787t + 16}{116} \quad (t < 0.008856)$$

Equation 1 denotes an equation for converting the values of the RGB color space of a pixel into X, Y and Z values and Equation 2 denotes an equation for converting the X, Y and Z values into L, a and b values. According to an exemplary embodiment, the L, a and b values are equal to the L*, a* and b* values of the CIE L*a*b color space.

An iterative number may be set to 0, to initialize all pixels of the image before search (operation 103).

Next, a pixel to be searched may be set (operation 104).

After the pixel to be searched is set, the set pixel may be compared with upper, lower, left and right pixels adjacent to the set pixel (operation 105).

Comparison may be performed based upon a color distance between pixels (operation 106).

If the color distance is less than a predetermined threshold, it is determined that the color distance between both pixels falls within an error range and the color value of the current reference pixel is copied to the compared pixel (operation 107). That is, both pixels may be treated as one pixel (pixel group) having the same color value.

After the color value is copied, the compared pixel may be redefined as the search pixel (operation 108). Thereafter, the redefined search pixel is compared with upper, lower, left and right pixels adjacent to the search pixel (operation 105).

If the color distance is greater than or equal to the predetermined threshold, it is determined whether the compared pixel is a last search pixel (operation 109).

If it is determined that the compared pixel is the last search pixel, it is determined whether the iterative number is greater than a predetermined value n (operation 110), to reduce error. The iterative number may be set according to an error range desired by a user.

If the iterative number is greater than the predetermined value, an image segmentation process is finished. In contrast, if the iterative number is less than or equal to the predetermined number, it is determined that search is not yet finished. Then, the iterative number is increased (operation 112) and search is performed again (operation 104).

After the input image is converted into the Lab color space, the color distance between adjacent pixels may be iteratively calculated while searching for first to final pixels of the image. If the color distance falls within a predetermined range, the colors of the compared two pixels are changed to the same color. The color distance between the two pixels may be obtained by Equation 3.

$$distance = \sqrt{((L(x, y) - L(x+u, y+v))^2 + (a(x, y) - a(x+u, y+v))^2 + (b(x, y) - b(x+u, y+v))^2)}$$ Equation 3

X(x, y) denotes an X value (L, a or b) of a pixel (x, y) and X(x+u, y+v) denotes an X value of an adjacent pixel of the pixel. In addition, u and v generally have a value between −1 and 1.

If the color distance is less than the predetermined threshold, a process of setting the adjacent pixel to the search pixel, obtaining the color distance between the search pixel and the adjacent pixel thereof and changing the color value of the adjacent pixel to the same color value is iteratively performed. By iteratively performing such a process, an image divided into pixel groups may be finally obtained.

Figure 4:
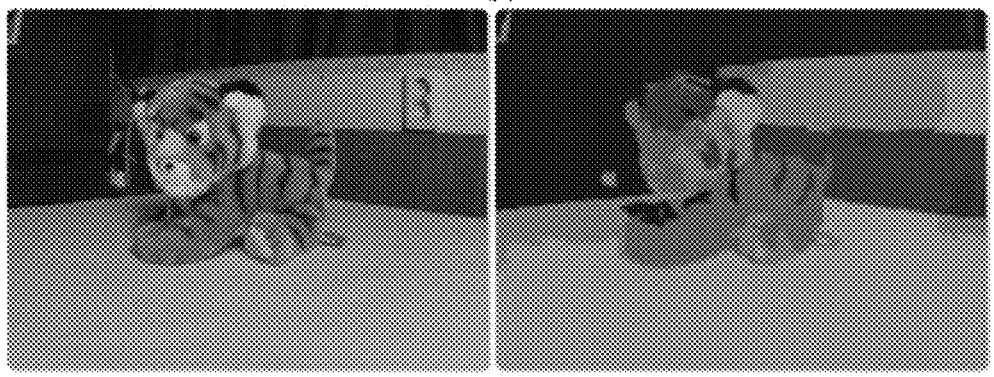
FIG. 4 illustrates an exemplary photographed image divided into pixel groups according to another embodiment of the present invention.

FIG. 4 illustrates a photographed image divided into pixel groups according to an exemplary embodiment of the present invention.

Image 400 is an original input image and image 410 is a photographed image divided into pixel groups. That is, the photographed image divided into the pixel groups may be simplified as compared to the original image.

Figure 5:
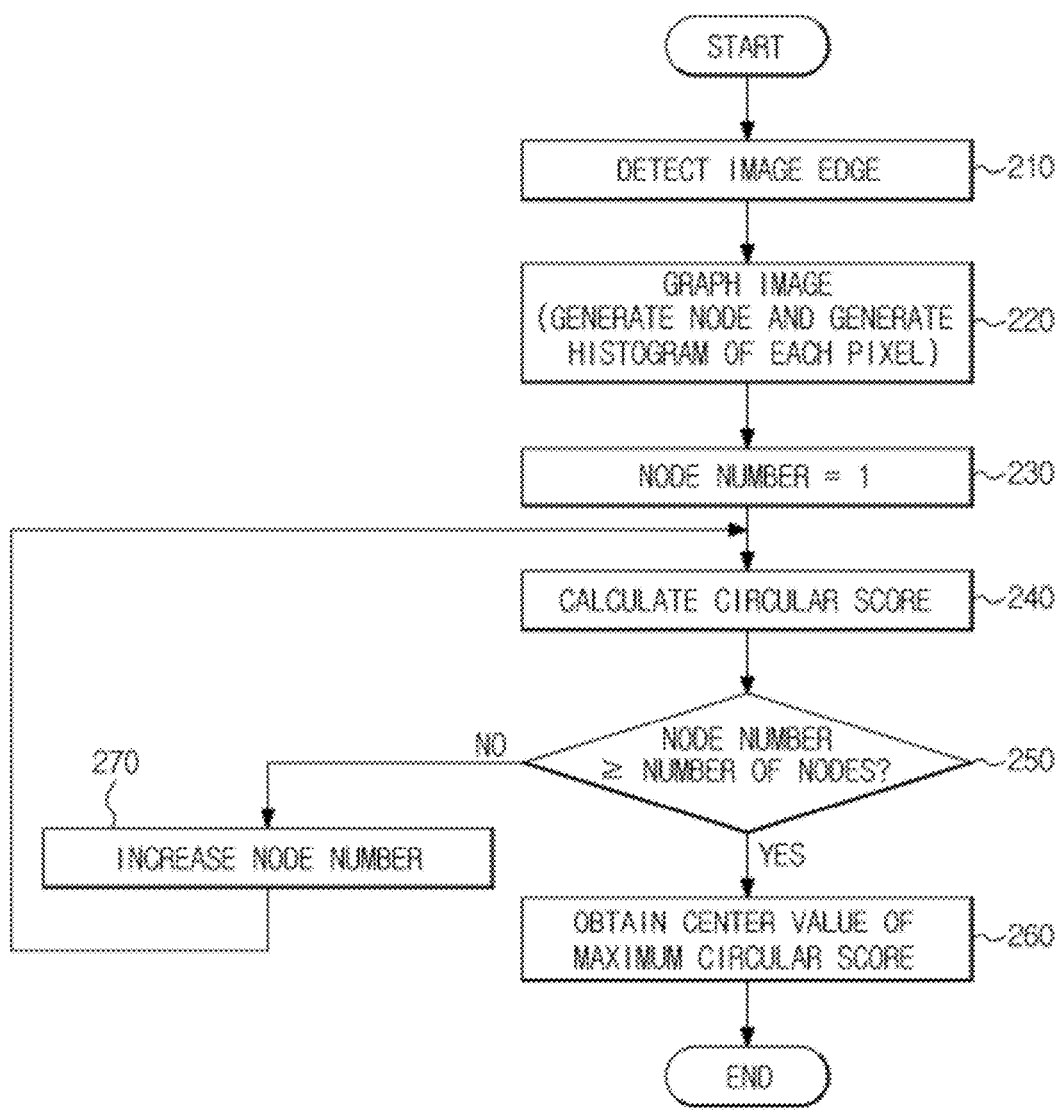
FIG. 5 illustrates a process of estimating the position of a front view within an image according to another embodiment of the present invention.

Estimation of the position of the front view based on the photographed image divided into the pixel groups is disclosed with reference to FIG. 5.

FIG. 5 illustrates a process of estimating the position of a front view within an image according to an embodiment of the present invention.

Estimation of the position of the front view in the image divided into the pixel groups includes detecting an edge, graphing pixels included in the image (generating a node 10 and generating a segment histogram), and calculating a circular score of the node 10.

Image edges may be detected from the image divided into the pixel groups (operation 210). Examples of the edge detection method include a method of detecting an edge using a canny edge detector.

In general, the edge detector is sensitive to noise. The canny edge detector is an algorithm which has been developed to prevent incorrect edge detection from being performed due to noise.

The algorithm of the canny edge detector provides a method of finding an edge satisfying good detection, good localization and clear response.

Good detection may be defined as a capability to detect all actual edges and good localization minimizes a difference between an actual edge and a detected edge. In addition, clear response may be defined as a unique response of each edge.

The algorithm of the canny edge detector includes calculating a gradient in x and y directions through Gaussian smoothing filtering, calculating edge strength based on the gradient, and utilizing hysteresis.

Figure 6:
FIG. 6 illustrates an edge image generated by detecting an edge of an image divided into pixel groups according to another embodiment of the present invention.

FIG. 6 illustrates an edge image generated by detecting an edge of an image divided into pixel groups according to another embodiment of the present invention.

The image is graphed using the detected edges (operation 220). The graphing operation includes generating a node 10 and generating a histogram of each pixel.

In the generation of the node 10, the node 10 is a point where two or more edges meet in the edge image. While an n×n window 5 is moved from a start pixel to a last pixel of the image, the color of each pixel of the window 5 is determined and a determination as to how many pixel groups the window 5 is divided into is made. If the number of pixel groups is three or more, it may be determined that the pixel of the window is the node 10.

Figure 7:
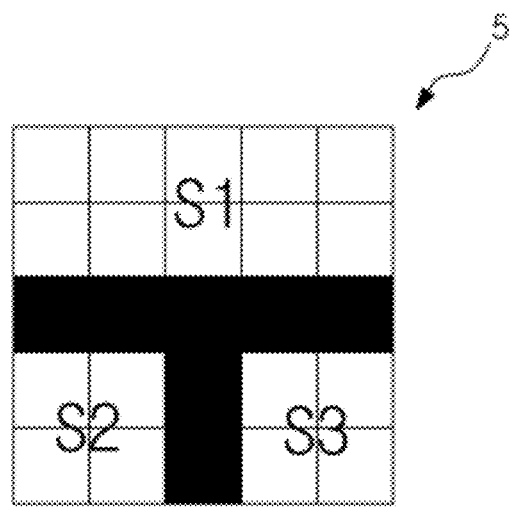
FIG. 7 illustrates a window including a node according to another embodiment of the present invention.
Figure 8:
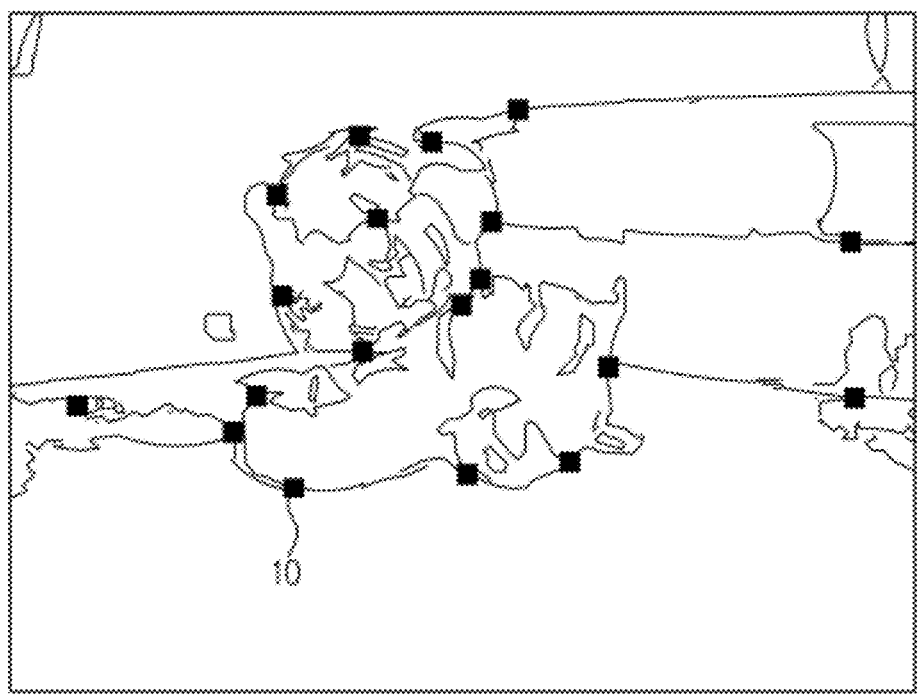
FIG. 8 an edge image including a node.

FIG. 7 illustrates a window including a node according to another embodiment of the present invention. As illustrated in FIG. 7, since the window includes three pixel groups S1, S2 and S3, the window includes the node 10. FIG. 8 is a schematic view of the edge image of FIG. 6 including the node of FIG. 7.

An operation of generating the histogram of the pixel is disclosed.

Each node 10 may have connected edges and a pixel group. An edge has a node 10 or a point of an image other than the node at both ends thereof. The pixel group included in the node 10 includes values obtained by converting the pixels belonging to the pixel group into a CIE L*a*b* color space and, based on these values, a two-dimensional histogram based on an a* axis and a b* axis may be generated. The a* axis and the b* axis may have various sizes and may have, for example, a bin having a size of 32. That is, a and b values of each bin are illustrated in Table 1.

TABLE 1

| bin | a* | b* |
| --- | --- | --- |
| 1 | −128~−96 | −128~−96 |
| 2 | −96~−64 | −96~−64 |
| 3 | −64~−32 | −64~−32 |
| 4 | −32~0 | −32~0 |
| 5 | 0~32 | 0~32 |
| 6 | 32~64 | 32~64 |
| 7 | 64~96 | 64~96 |
| 8 | 96~128 | 96~128 |

Figure 9:
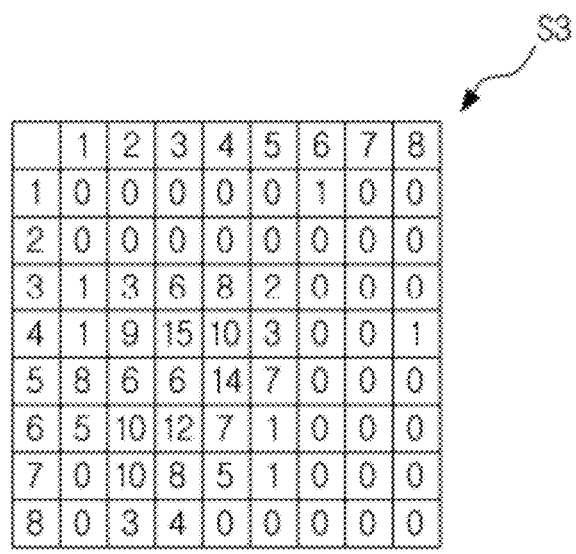
FIG. 9 illustrates a histogram of any one pixel group included in a window.

The two-dimensional histogram of each pixel is illustrated in FIG. 9. FIG. 9 is a schematic diagram showing a histogram of any one pixel group, for example, S3 included in the window illustrated in FIG. 7.

The number of the node 10 may be initialized. The number of the node 10 may be set to 1 (operation 230).

A circular score is calculated (operation 240). The circular score is a criterion used when the front view of the image is obtained. A circular center having a highest score may be determined to be a front view of an object.

The circular score is a numerical value indicating similarity between nodes 10 in a circular path which starts from one node 10 (the number 1 of the node 10), passes through edges and other nodes 10 and returns to the node 10. Objects within an image generally have closed curves and the color distribution of the closed curves is similar. Accordingly, if circulation is performed along edges configuring the closed curve of the object, a highest circular score is obtained.

Figure 10:
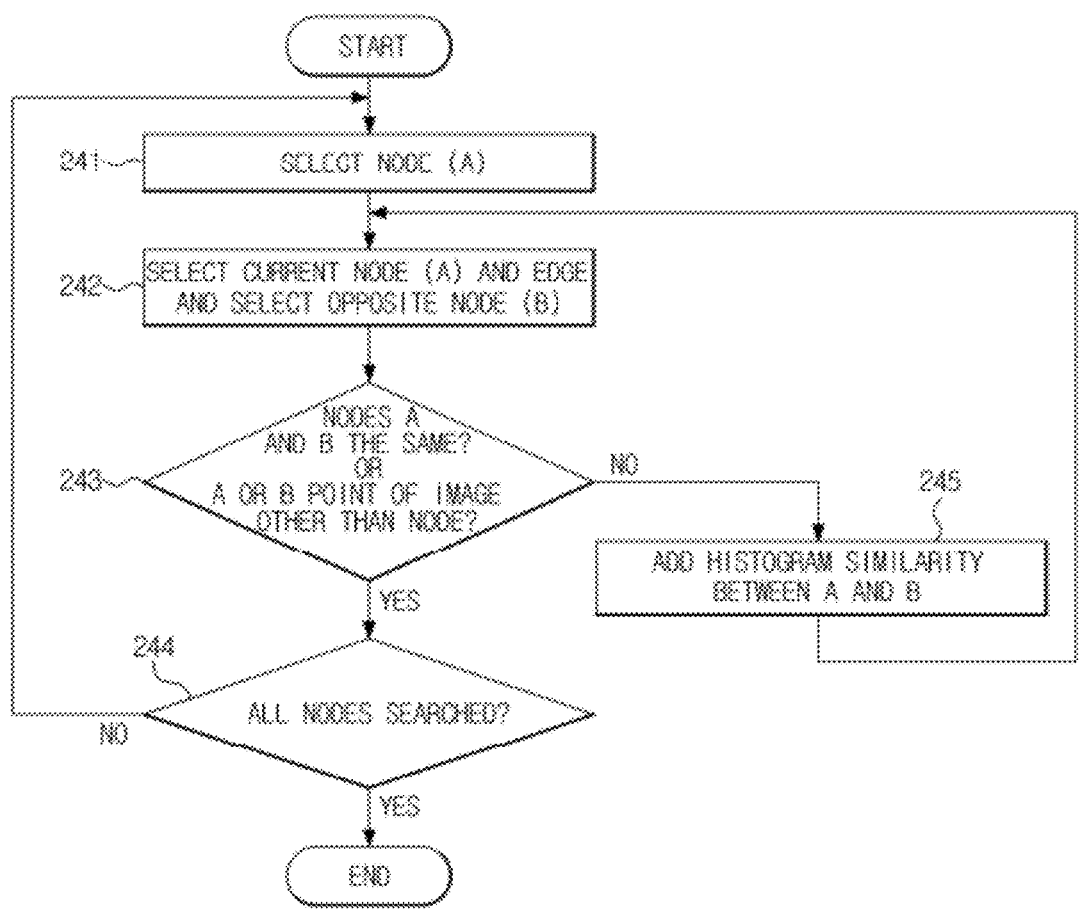
FIG. 10 illustrates an operation for calculating a circular score according to another embodiment of the present invention.
Figure 11:
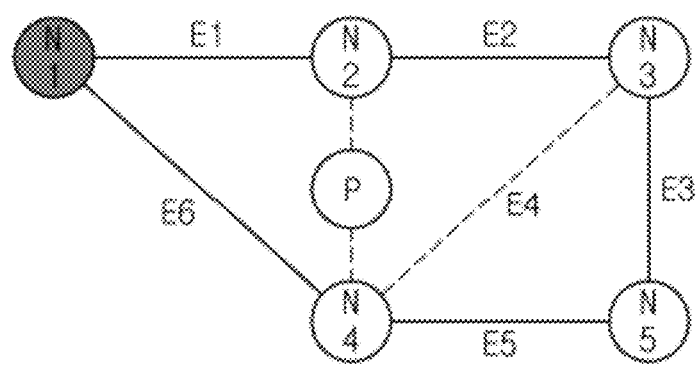
FIG. 11 illustrates an estimation of the position of a front view of an image according to another embodiment of the present invention.

The process of acquiring the circular score may be performed by the process illustrated in FIG. 10 and a state diagram illustrated in FIG. 11.

FIG. 10 illustrates a calculating a circular score according to an exemplary embodiment of the present invention, and FIG. 11 illustrates an estimation of the position of a front view of an image according to an exemplary embodiment of the present invention.

Referring to FIG. 10, a node (A) is selected (operation 241), an edge of the current node (A) is selected, and an opposite node (B) is selected (operation 242).

A determination is made as to whether the selected node (A) and node (B) are the same or whether the selected node (A) or node (B) are a point of an image other than the node (operation 243).

If it is determined that the selected node (A) and node (B) are the same or the selected node (A) or node (B) are a point of an image other than the node, it is determined whether all nodes have been searched (operation 244). If it is determined that all nodes have been searched, the operation for calculating the circular score is finished and, if it is determined that all nodes have not been searched, Operation 241 for selecting the node is performed again.

If it is determined that the selected node (A) and node (B) are not the same or the selected node (A) or node (B) are not an end of the image, an operation for calculating histograms of the node (A) and the node (B), calculating histogram similarity based on the histograms, and adding the histogram similarity (that is, accumulating the histogram value) (operation 245), and then Operation 242 of selecting the node are performed. That is, the histogram similarity is obtained with respect to all nodes and is accumulated, thereby calculating the circular score.

The histogram similarity between the node A and the node B is measured by comparing the color histograms of the pixels included in the pixel groups of the node. The node has three or more pixel groups and a highest value obtained by comparing all the pixel groups of two nodes is set to a similarity between the pixel groups of the two nodes. The comparison between the histograms is performed using a chi square test. The histogram similarity S between the two nodes (A, Bi) is obtained by Equations 4 and 5.

$$S(A, B_i) = \mathrm{argmax} S(a, b_i) \quad \text{Equation 4}$$

$$S(a, b_i) = \frac{1}{2}\sum_{k=1}^{K} \frac{[h_a(k) - h_{b_i}(k)]^2}{h_a(k) + h_{b_i}(k)} - D \quad \text{Equation 5}$$

where, a and b respectively denote pixel groups respectively belonging to nodes (A and B) and $h_a$ and $h_b$ respectively denote the histograms of the pixel groups. In addition, i denotes the number of nodes which has passed up to now or the index of a current node in circulation. D denotes a reference value of the histogram similarity. The histogram similarity may be expressed as a numerical value based on the value D.

A circular score CS of circulation j which starts from a node (a) and passes through k nodes 10 may be expressed by a histogram similarity sum and is expressed by Equation 6.

$$CS(j) = \sum_{i=0}^{k} S(a, b_i) \quad \text{Equation 6}$$

A circular center P in which the calculated histogram similarity sum is highest may be estimated as the position of the front view of the image. The circular center P may be obtained by Equation 7.

$$p(j) = (x, y) \quad \text{Equation 7}$$

$$x = \frac{\sum_{i=1}^{k} x_i}{k}$$

$$y = \frac{\sum_{i=1}^{k} j_i}{k}$$

As illustrated in FIG. 7, the circular center P corresponds to an average of the positions of all the passing nodes 10 during circulation.

FIG. 11 illustrates the circular score exists in all nodes 10 and all circulations. One node may be set to a reference node (N1). The current node (N1) may be connected to two or more edges (an edge E1 and an edge E6). One edge may be selected from the two edges and a node which is located at the opposite side of the selected edge is selected. The histogram similarity E1 between the reference node (N1) and the current node (N2) is measured and is added to the circular score.

One edge is selected from among the edges connected to the current node (N2), a node (N3) located at the opposite side of the selected edge is selected, and the histogram similarity between the reference node (N2) and the current node (N3) is measured and is added to the circular score. When an edge is selected in the node, an edge which has already been used may not be selected regardless of directions.

Such a process is finished when an end of the image is reached and the current node is returned, and the score acquired by this process and the center value of the positions of the passing nodes are stored. In FIG. 11, the center position of the current circulation is P. After this process is finished with respect to all nodes, the acquired scores are compared and the center position of a node having a maximum circular score is the position of the front view of the object within the image.

A determination is made as to whether the number of the selected node 10 is greater than or equal to the total number of nodes (operation 250).

If the number of the selected node is greater than or equal to the total number of nodes, since the circular scores of all the nodes have been calculated, the circular center value P having the maximum circular score is estimated as the position of the front view within the image (operation 260).

If the number of the selected node is less than the total number of nodes, since all nodes have not been searched, the number of the node is increased, the non-searched nodes are searched and the circular score is calculated again.

Figure 12:
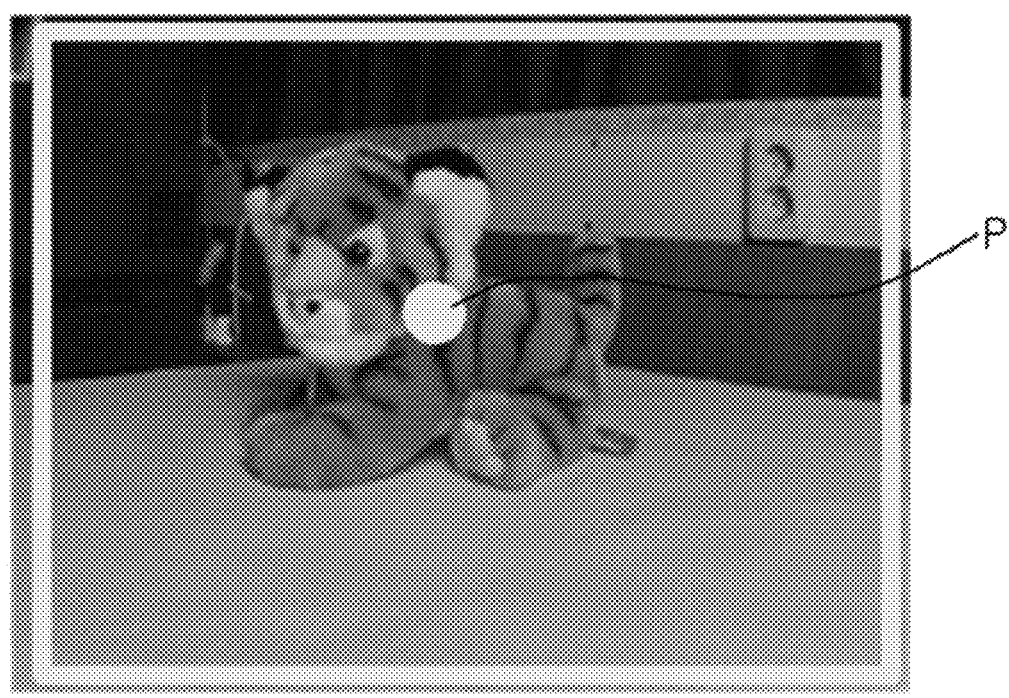
FIG. 12 illustrates a designation of the position of a front view of an image estimated according to another embodiment of the present invention.
Figure 13:
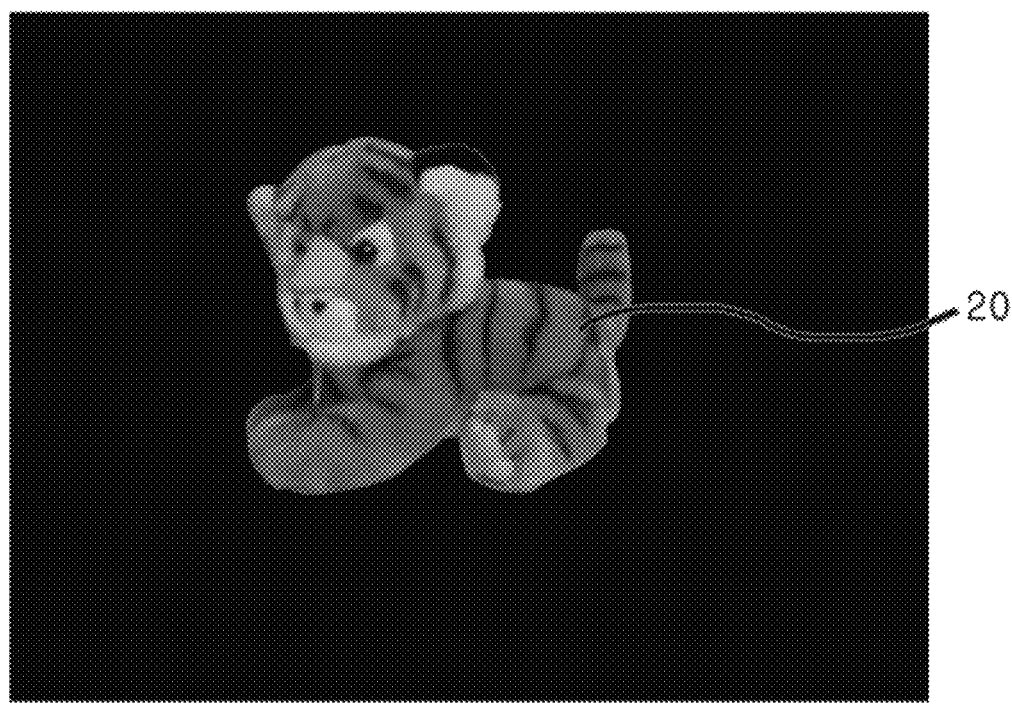
FIG. 13 illustrates a separation of a front view and a background of an image according to another embodiment of the present invention.

FIG. 12 illustrates a designation of the position of a front view of an image estimated according to an embodiment of the present invention, and FIG. 13 illustrates a separation of a front view and a background of an image according to an embodiment of the present invention.

To separate a front view from a background of an image, graph cut may be used. If an average position of a node of a circular center P having a highest circular score is designated as a front view of graph cut (see, for example, FIG. 12) and a boundary is designated as a background so as to perform graph cut (see, for example, FIG. 13), it is possible to automatically separate the front view and the background of the image without user input.

According to an exemplary embodiment of a method of separating the front view and the background of the image, it is possible to automatically separate the front view and the background of the image and improve performance of an algorithm for recognizing an object or the attitude of an object.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of separating a front view and a background of an image, the method comprising:
   dividing with a processor one or more pixels included in a photographed image into pixel groups according to color similarity between the pixels;
   estimating the position of the front view in the image divided into the pixel groups; and
   separating the front view and the background based on the estimated position of the front view,
   wherein the estimating of the position of the front view in the image divided into the pixel groups includes:
      detecting edges between the pixel groups from the image divided into the pixel groups and generating an edge image,
      detecting nodes where two or more edges meet from the generated edge image,
      calculating a circular score indicating similarity between a start node and other nodes in a circular path that starts from any one of the nodes, passes through the edges and the other nodes and arrives at the start node, and
      estimating a circular center having a highest circular score among the calculated circular scores as the center position of the front view.

2. The method according to claim 1, wherein the dividing of one or more pixels included in a photographed image into the pixel groups according to the color similarity between the pixels includes converting an RGB color space of the photographed image into a Commission internationale de l'eclairage (CIE) Lab color space.

3. The method according to claim 2, wherein the dividing of one or more pixels included in a photographed image into the pixel groups according to the color similarity between the pixels includes calculating a color distance between any one pixel (first pixel) of the image converted into the CIE Lab color space and an adjacent pixel (second pixel) of the first pixel, changing the color of the second pixel to the color of the first pixel if the color distance is less than a threshold, and forming the pixel groups.

4. The method according to claim 3, wherein the dividing of one or more pixels included in a photographed image into the pixel groups according to the color similarity between the pixels includes calculating a color distance between the second pixel and an adjacent pixel (third pixel) of the second pixel if the color distance between the first pixel and the second pixel is greater than or equal to the threshold, and changing the color of the third pixel to the color of the second pixel if the calculated color difference is less than the threshold.

5. The method according to claim 1, wherein the generating of the edge image includes generating the edge image using a canny edge detector.

6. The method according to claim 5, wherein each node where two or more edges meet is a center pixel of an n×n window when the number of pixel groups included in the n×n window is three or more while moving the n×n window from a start pixel to a last pixel of the image.

7. The method according to claim 6, wherein the calculating of the circular score includes:
   generating a two-dimensional color histogram based on an a* axis and a b* axis of the CIE Lab color space of pixels belonging to the pixel groups forming each node;
   comparing the two-dimensional color histograms of pixel groups of two nodes having three or more pixel groups and calculating a largest two-dimensional color histogram as a histogram similarity; and
   calculating the circular score of the circular path based on the calculated histogram similarity.

8. The method according to claim 7, wherein the calculating of the circular score of the circular path includes calculating the circular score such that an edge passing through the circular path is not selected more than once.

9. The method according to claim 8, wherein the comparing of the histograms is performed based on a chi square test.

10. An apparatus for separating a front view and a background of an image, the apparatus comprising:
   an image processor dividing one or more pixels included in a photographed image into pixel groups according to color similarity between the pixels;
   a front view estimator for estimating the position of the front view in the image divided into the pixel groups; and
   an image separator for separating the front view and the background based on the estimated position of the front view,
   wherein the front view estimator detects edges between the pixel groups from the image divided into the pixel groups and generates an edge image, detects nodes where two or more edges meet from the generated edge image, calculates a circular score indicating similarity between a start node and other nodes in a circular path that starts from any one of the nodes, passes through the edges and the other nodes and arrives at the start node, and estimates a circular center having a highest circular score among the calculated circular scores as the center position of the front view.

* * * * *